United States Patent
Dellow et al.

(10) Patent No.: US 7,624,442 B2
(45) Date of Patent: Nov. 24, 2009

(54) MEMORY SECURITY DEVICE FOR FLEXIBLE SOFTWARE ENVIRONMENT

(75) Inventors: Andrew Dellow, Gloucester (GB); Peter Bennett, Bristol (GB)

(73) Assignee: STMicroelectronics Limited, Bristol (GB)

( * ) Notice: Subject to any disclaimer, the term of this patent is extended or adjusted under 35 U.S.C. 154(b) by 701 days.

(21) Appl. No.: 10/817,148

(22) Filed: Apr. 2, 2004

(65) Prior Publication Data
US 2005/0028004 A1 Feb. 3, 2005

(30) Foreign Application Priority Data
Apr. 3, 2003 (EP) .................................. 03252116

(51) Int. Cl.
*G06F 11/00* (2006.01)
(52) U.S. Cl. .......................................... 726/22; 726/27
(58) Field of Classification Search .................. 726/22, 726/27
See application file for complete search history.

(56) References Cited

U.S. PATENT DOCUMENTS 6,311,273 B1  10/2001  Helbig, Sr. et al. .......... 713/200
6,430,727 B1*  8/2002  Warren ........................... 716/4
2003/0005277 A1*  1/2003  Harding et al. ................ 713/2
2003/0229777 A1*  12/2003  Morais et al. .................. 713/2

FOREIGN PATENT DOCUMENTS

| EP | 0 481 735 A2 | 4/1992 |
| WO | WO 01/24012 A1 | 4/2001 |
| WO | WO 01/61437 A2 | 8/2001 |

* cited by examiner

*Primary Examiner*—Benjamin E Lanier
*Assistant Examiner*—Devin Almeida
(74) *Attorney, Agent, or Firm*—Lisa K. Jorgenson; Allen, Dyer, Doppelt, Milbrath & Gilchrist, P.A.

(57) ABSTRACT

A semiconductor integrated circuit includes a processor for executing application code from a memory and a verifier processor arranged to receive the application code via the same internal bus as the processor. The verifier processor performs a verification function to check that the application code is authentic. The verifier processor runs autonomously and cannot be spoofed as it receives the application code via the same internal bus as the main processor. An additional instruction monitor checks the code instructions from the CPU and also impairs the operation of the circuit unless the address of code requested is in a given range. The code is in the form of a linked list and the range is derived as a linked list table during a first check.

32 Claims, 5 Drawing Sheets

MEMORY SECURITY DEVICE FOR FLEXIBLE SOFTWARE ENVIRONMENT

BACKGROUND OF THE INVENTION

1. Field of the Invention

The present invention relates to a memory security device, and in particular to the security of flash memory used in conditional access devices.

2. Description of the Related Art

In conditional access devices for pay television, or any other device using memory and requiring security, there is a need to provide flash memory but to avoid hacking. Hacking is the unauthorised placing of software in memory to override security features.

A known way of attempting to prevent hacking is to use some form of checking instructed by ROM memory to ensure that an application code stored in flash memory is correct.

In such devices, a flash memory has a boot sector and an application sector. A CPU is arranged to run application code from the flash memory retrieved over an interface. The security is provided by the fact that the CPU boots from a boot ROM which contains code to check the boot sector of the flash memory. This is done once by the CPU producing a function of the code in the boot sector and comparing with a stored signature on startup. The CPU then jumps to the code in the boot sector if it passes the check.

We have appreciated, however, that there is a relatively simple way of hacking such a security arrangement. When the CPU boots up using code from the ROM, the CPU checks that the code in the boot sector is correct. The weakness is that the process of power on, CPU boot and checking the flash takes a predictable number of clock cycles of the CPU clock. Thus to hack the system, a hacker places code in an unchecked part of the flash memory and forces the CPU to read from that part of the memory after a predetermined number of clock cycles by fixing an external address line.

The CPU thereafter runs from unchecked code and no further checks are conducted, because the verification of code is only conducted on boot up from the ROM.

We have appreciated the problem that memory storing application code within devices can be insecure and prone to hacking by storing unauthorised code.

We have further appreciated the need to provide security to memory which stores application code, but to also allow the application code to be changed or updated. Further, we have appreciated deficiencies in the prior art in that a CPU could be hacked to run from unverified code, whilst checking devices redundantly checks verified code.

BRIEF SUMMARY OF THE INVENTION

An embodiment of the invention comprises an additional processor termed a verifier processor and code arranged to read data from a memory to be checked, to produce a function of that data, and to verify that function of the data against a stored code. The verifier processor is on the same device and has the same external interfaces as a CPU which runs application code from the memory. The advantage of using an additional processor on the same device as a CPU is that the system cannot be hacked by changing code stored in memory as the additional processor would then also receive changed application code which would not be verified.

The verifier processor is arranged to continually check the flash memory whilst the CPU executes from the flash memory. If the address lines of the device were redirected so that the CPU runs from unauthorised code, then the verifier processor would also be redirected to that unauthorised code which would not pass the check.

Code stored in memory (flash or otherwise) is thus hashed using a hashing function such as MD5 and signed using a signature algorithm such as RSA by the author of the code. The hash of the code is signed using a private key, and stored in flash. The verifier processor reads the section of signed code, and produces a hash of the code. The verifier processor then uses the corresponding public key to decrypt the hash. The prestored signature of the hash signed with the private key is retrieved and also decrypted using the public key. Using known digital signature techniques the result of hashing and signing the code is compared with the decrypted stored digital signature. If they do not match, the code is considered compromised and the circuit functioning is impaired by issuing a device reset or similar.

In addition to the verifier processor, an instruction monitor is arranged to monitor instructions from the CPU to read from memory and checks that the instruction fetches are within a range of addresses that have been signature checked as described above.

The embodiment thus comprises an additional processor function which runs independently of a CPU but is within the same integrated circuit as that CPU and shares the same bus. The processor function analyses the application code applied to the CPU and, if not authentic, issues a reset signal to reset the integrated circuit. An instruction monitor ensures that the CPU can only take instructions from checked areas of memory. On detecting code fetches which fall outside the allowed range, the function of the circuit is impaired by issuing a reset or other impairing action.

BRIEF DESCRIPTION OF THE DRAWINGS

An embodiment of the invention will now be described by way of example only and with reference to the figures in which.

DETAILED DESCRIPTION OF THE INVENTION

Figure 1:
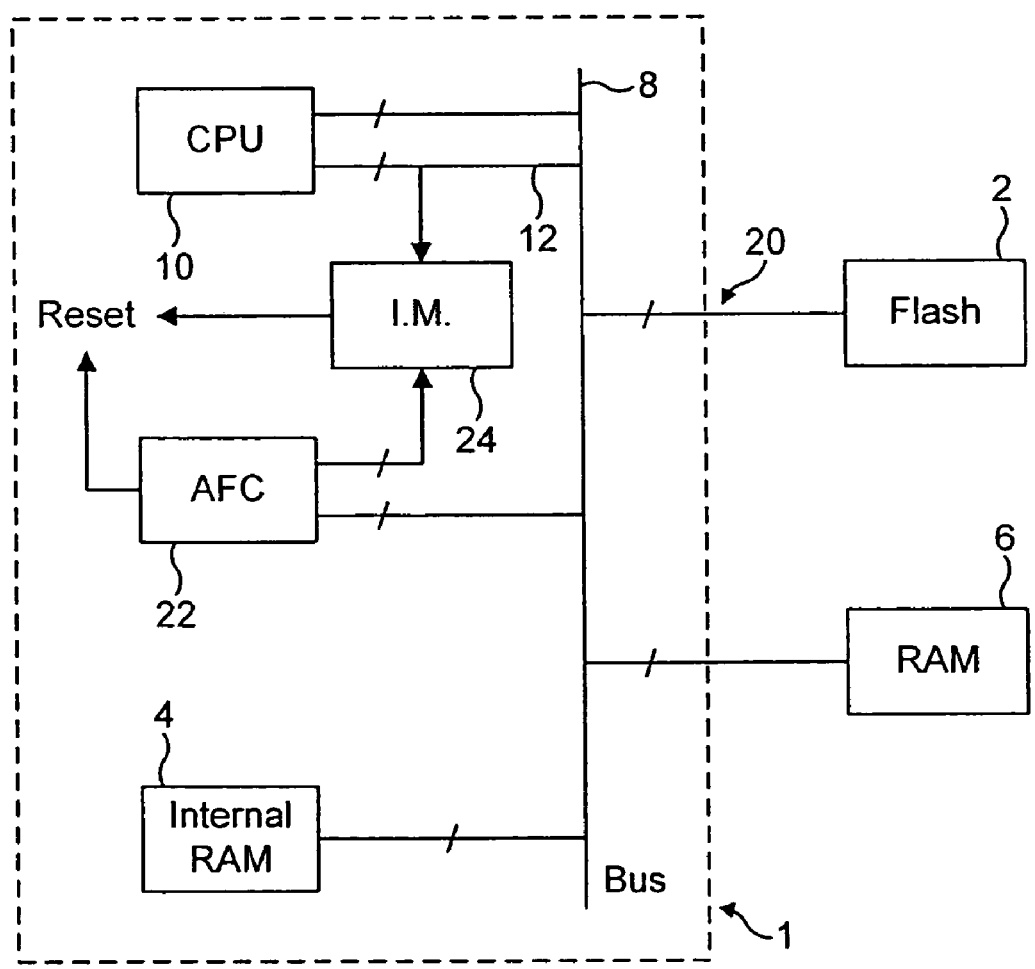
FIG. 1 shows the main components of an integrated circuit embodying the invention.

An integrated circuit 1 according to one embodiment of the invention is shown in FIG. 1. A processor (CPU) 10 is connected via an internal bus 8 and an external interface 20 to a flash memory 2. The flash memory 2 contains application code for execution by the CPU 10. Internal RAM 4 and external RAM 6 are also provided.

The circuit 1 also comprises two additional components for ensuring that code in flash 2 is not hacked: a verifier processor 22 known as an Autonomous Flash Checker (AFC) and an instruction monitor (IM) 24. The purpose of the AFC is to check portions of code from memory 2 and verify that those portions match a corresponding signature accompanying the code. If the signature does not match, then the AFC 22 will issue a reset instruction. The purpose of the instruction monitor 24 is to monitor code instruction requests on an instruction line 12 from the CPU 10 and to check that the requests fall within an allowed range as reported by the AFC 22. If the instruction requests fall outside that range, the instruction monitor 24 issues a reset instruction. The CPU 10 is thereby prevented from executing unsigned unchecked code.

On power up of integrated circuit 1, the CPU 10 is directed to the boot vector of the flash memory 2. The application code is then retrieved over bus 8 by the CPU 10 which executes the code. The application code is stored in a signed code portion of the flash memory 2. It is noted that the AFC 22 is connected to the same internal bus 8 and external connections as the CPU, and so retrieves exactly the same code as the CPU without possibility of external interference. This is because the CPU, AFC processor and interconnect bus 8 are all part of the same integrated circuit.

The CPU 10 and flash memory 2 operate in a known fashion, unless the AFC processor determines that the application code in flash memory 2 is not authentic, in which case, it impairs operation of the device 1 by issuing a reset causing the device 1 to reset and the boot sequence to be restarted. Thus, if the application code has been tampered with, the set top box will repeatedly reboot and will not function for example to decrypt received TV signals. Other forms of impairing the operation of device 1 could be used such as disabling or stopping the device clock or otherwise limiting the functionality of the device.

Figure 2:
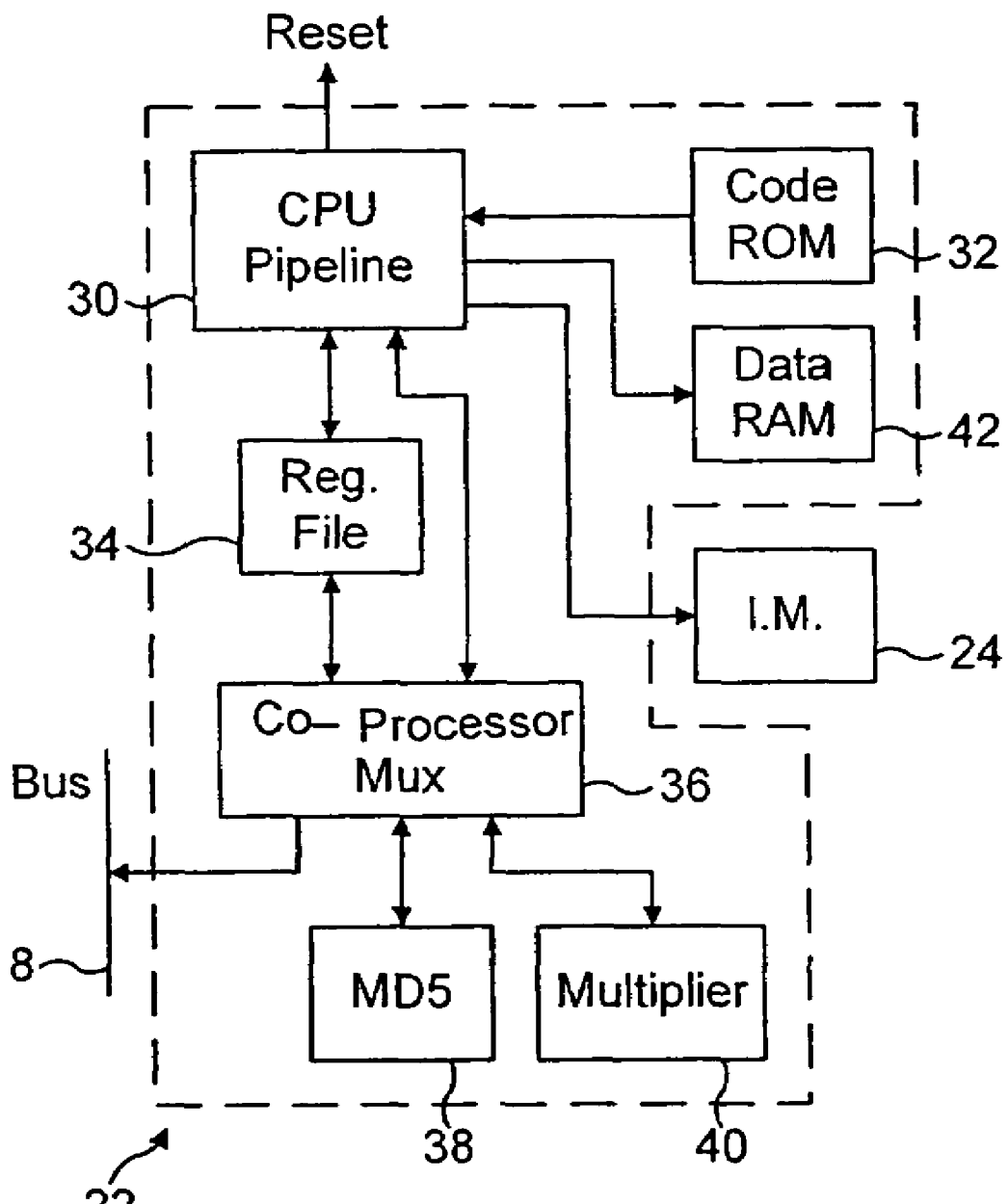
FIG. 2 shows a more detailed view of the architecture of the autonomous flash checker (AFC) shown in FIG. 1.

The main components of the AFC are shown in greater detail in FIG. 2. A CPU core 30 provides the encryption/decryption functions as well as the digital signature checking already described, and operates under instruction from code ROM 32. The code ROM contains code for executing digital signature checking and memory to memory data processing functions. It also contains the public key of the or each provider of the code that is stored in flash 2 (FIG. 1). A register file 34 provides general purpose read-write registers. A coprocessor MUX 36 connects the core CPU 30 to the bus 8 and also two coprocessors, an MD5 coprocessor 38 and a multiplier coprocessor 40. The MD5 coprocessor carries out the hashing function required by the digital signal algorithm. The multiplier coprocessor 40 is used during RSA encryption.

The AFC processor 22 operates by producing a hash function and a signature of the application code using a public key from the code ROM 32 (FIG. 2) as will now be described with reference to FIGS. 1 and 2.

The AFC 22 executes code stored in code ROM 32 and uses RAM 42 for temporary storage. The code in code ROM 32 is only accessible by the verifier processor and instructs the processor 30 to undertake the following steps:

produce a hash of application code received from the flash memory;

produce a signature function of the hashed code; and verify that the signature is correct.

The verifier processor 30 is not externally accessible other than in specific ways described later, and so cannot be hacked and only runs from the code in ROM which cannot be changed.

If the signature is correct then the application code in flash memory 2 is deemed authentic.

The steps set out above are undertaken continually; each set of steps comprising a cycle of the verifier processor. During each cycle the CPU 10 continues to operate as normal in retrieving and executing the application code over the same internal bus 8 as used by the verifier processor 30. Accordingly, to avoid reducing the performance of the CPU 10, the verifier processor requests application code from the memory less frequently than the CPU, for example the verifier requests code once every 1,000 to 10,000 CPU requests. Also, the verifier requests are at pseudo random times and could be at pseudo random locations. This helps obscure the verifier requests amongst the CPU requests. The requests made at external connections at interface 20 for data from the flash 2 thus comprise CPU requests and pseudo random requests at pseudo random times comparatively infrequently mixed together. It is thus infeasible for a hacker to determine how to spoof the external address lines to direct the CPU 10 to hacked code but the verifier 30 to genuine code. The use of pseudo random locations and times makes spoofing harder. The requests to the flash memory themselves are indistinguishable, whether made by the CPU or verifier processor.

As each word of data to be hashed is fetched from memory 2 it is passed to the MD5 coprocessor which performs the one way hash on the data. The hash function can be any one-way hash function which has the advantage that any small change in the application code will result in a large change in the hashed code, but is mathematically all but impossible to derive multiple changes that could be made to the application code such that the hashed code is unchanged. Preferably, the MD5 coprocessor 38 continually receives the application code from the flash in a pseudo-random read pattern, and uses a known hash function such as MD5.

Each block of code has an associated digital signature which was generated using the code author=s private key. The signatures are in a portion of memory 2 not to be checked. The next step is then to verify the hashed code against the signature by the standard digital signature technique of decrypting the signature using the public key and comparing to the hashed code. The preferred algorithm is RSA. Provided that the signature is verified, then no action is taken. If the application code does not verify the signature, however, an impair function results by issuing a chip reset, preventing the chip operating further.

Figure 3:
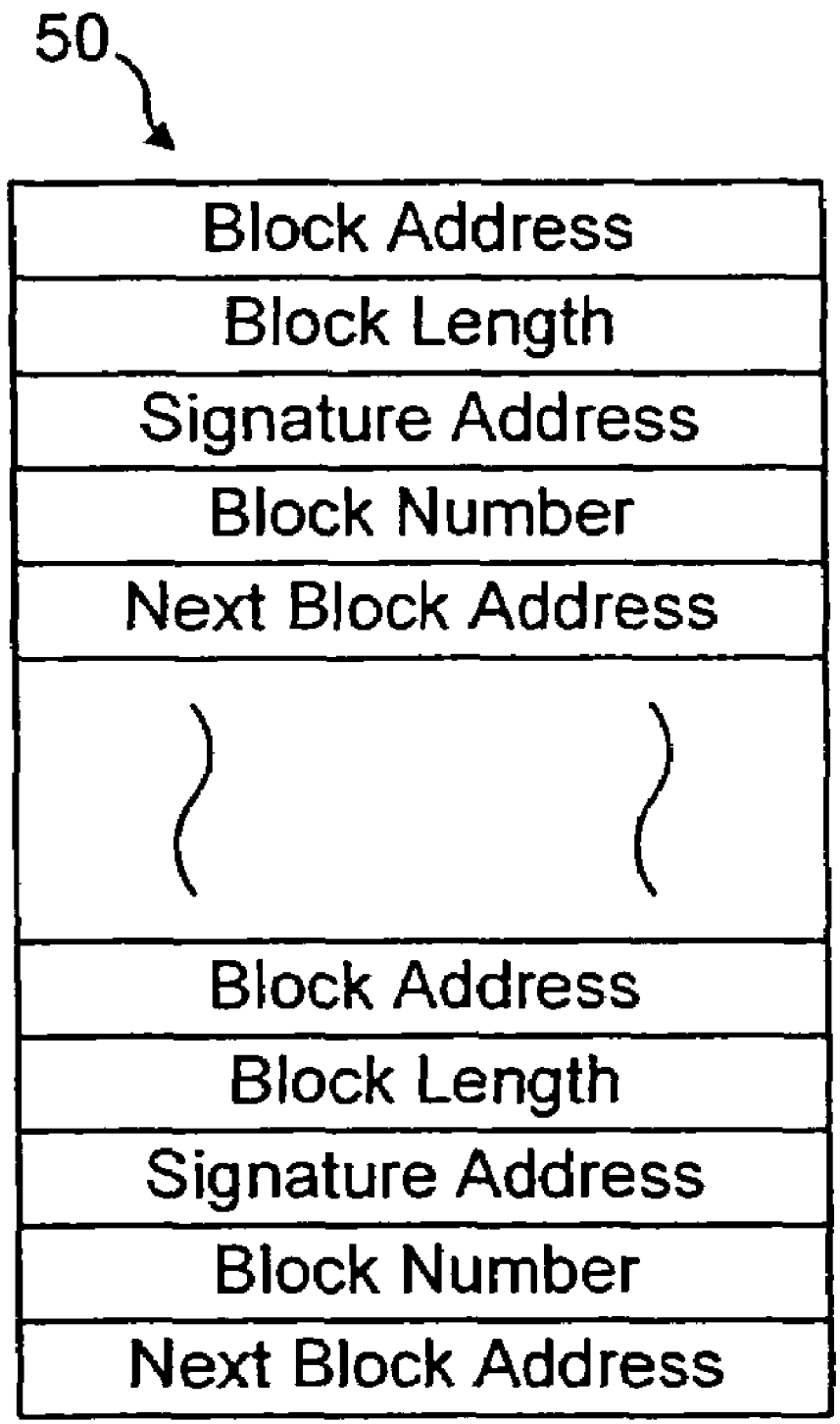
FIG. 3 shows the link list structure for two nodes.

Whilst the arrangement described so far is secure, we have appreciated that security can be improved, particularly for software in the memory 2 which is constructed and maintained as a linked list. A linked list is a known technique for organizing code and comprises a plurality of nodes, each node having an address, length and pointer to the next block defining how the code is stored in memory 2. This allows code to be downloaded to add or remove blocks of code from the linked list. The structure of an example block in a linked list 50 is shown in FIG. 3. There is a hard-defined address in memory that is the start of a table that contains information as to the size of each signed block, size of block and so on. The pointer to the start of this table is hard defined in a fixed location in local ROM 32.

The structure of the table, as shown in FIG. 3, includes the block address, this being the address of the start of signed code, the block length, the signature address, this being the location of the signature corresponding to the block of code, the block number and the address of the next block.

Figure 4:
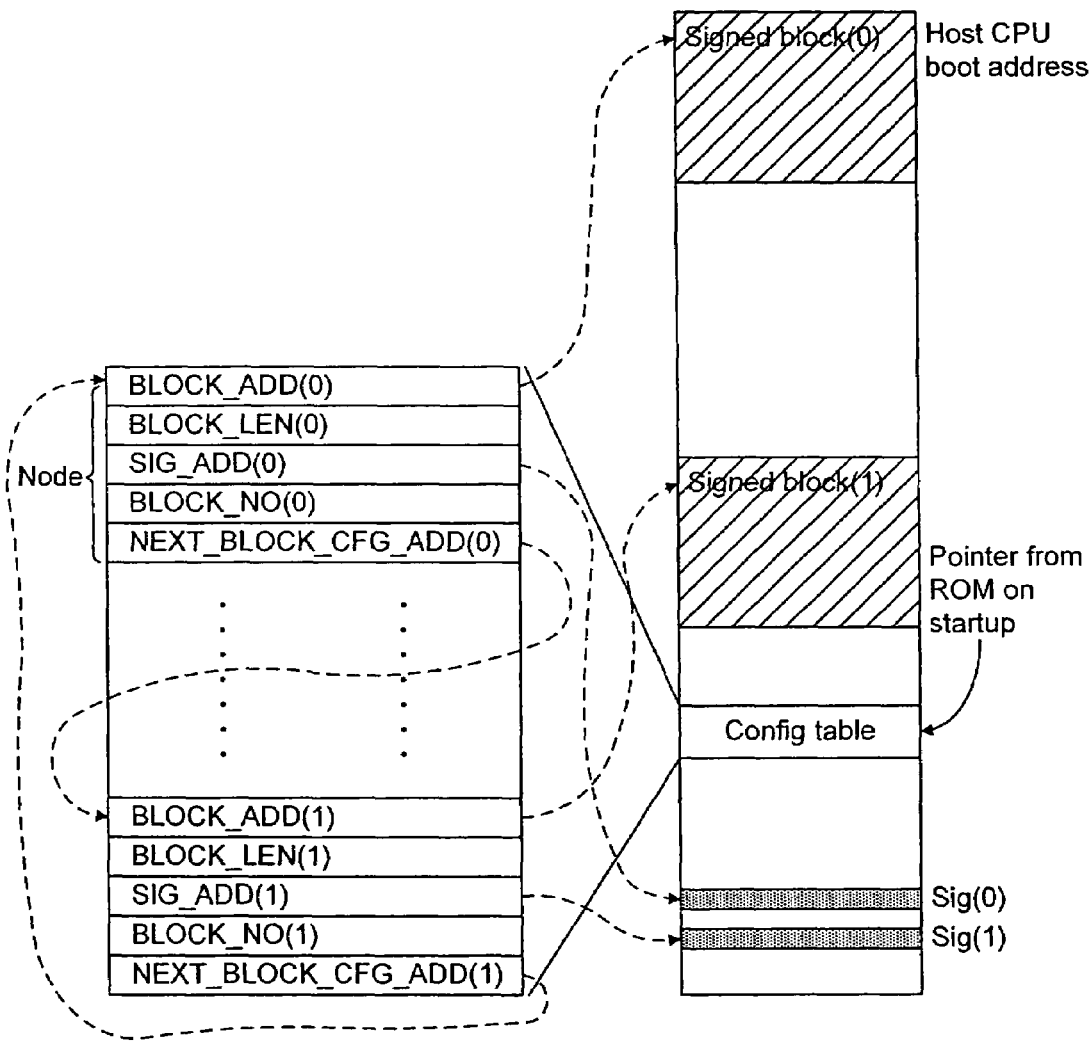
FIG. 4 shows the flash memory structure including link lists of FIG. 3.

The structure of the memory 2 using a linked list is shown in FIG. 4. As can be seen, there are signed portions and unsigned portions of memory. Each node points to the address of the each block and its corresponding signature 52. A pointer at a fixed location indicates the location of the first node and thereafter follows from one block to another as defined by the address nodes.

The instruction monitor 24, as shown in FIG. 1, monitors instruction requests made by CPU 10 to memory 2 to ensure that only checked portions of memory are accessed. As shown by the explanation of the linked list memory structure, the instruction monitor needs information as to the areas of memory that have been verified. In its simplest form, this could be achieved by only allowing the CPU to run from a predefined area of memory. As an alternative, there could be a plurality of fixed predefined regions, but preferably there is a dynamic linked list from which a table of allowed areas is devised by the AFC 22. The latter requires an initial check of the whole linked list (the list being dynamic in that a table cannot be derived until the whole list has been checked) to derive the table and thereafter the instruction monitor checks that the CPU only requests from checked areas. For this reason there are two main modes of operation: boot sector only mode; and linked list mode.

Figure 5:
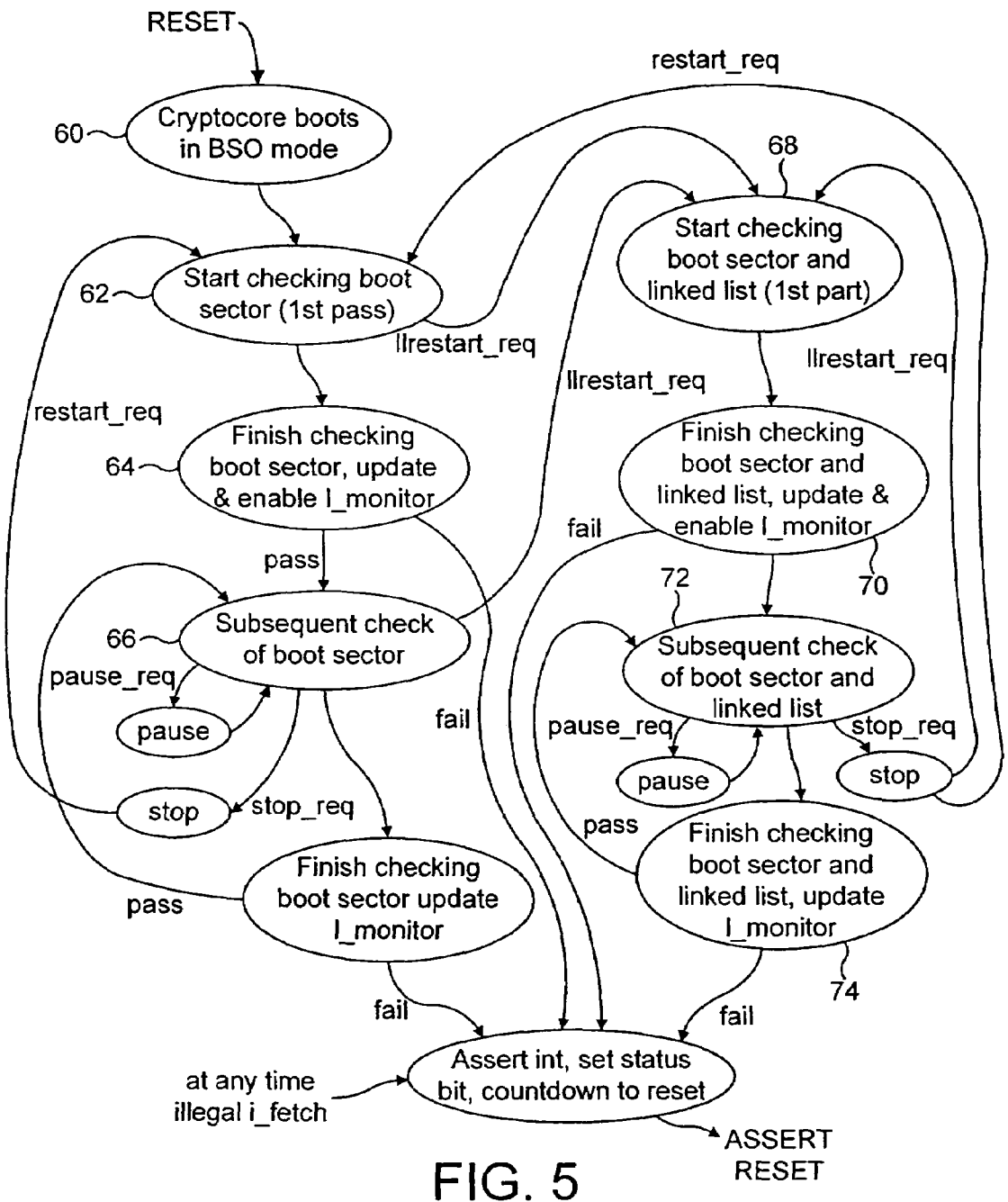
FIG. 5 shows the process steps of checking code.

The functioning of the AFC 22 and IM 24 are shown in FIG. 5, including the two modes of operation. On reset of the circuit 1 (powerup), the core CPU 30 (known as cryptocore) boots in a boot sector only (BSO) mode at step 60. The core CPU 30 starts checking the boot sector in the Flash 2 for the main CPU 10 at step 62 by performing the signature check as previously described. During this process the instruction monitor IM 24 is switched off. No pause or step requests are allowed during this check.

On completion of this first check, the AFC 22 updates a table of allowed addresses stored in RAM 42 and enables the instruction monitor 24 at step 64. Thereafter, at step 66 the boot sector check is repeated cyclically and may now be paused or stopped as described later.

At the same time as the boot sector check, the main CPU 10 is booting from memory 2 and copies code to RAM 4 for subsequent execution. The instruction monitor is off for the first high speed check.

At any point in the boot sector only mode the main CPU 10 may issue a linked list restart request. This will cause the cryptocore 30 to immediately stop the current process and restart performing a boot sector check followed by a linked list (at step 68). No pause or stop requests are allowed during this check following a restart request. As before, the linked list table is updated and enabled after the first completed check at step 70. The linked list check is then repeated cyclically at step 72 and 74.

The linked list when checked once is stored as a linked list table in RAM 42 to which the instruction monitor then refers to ensure any CPU requests are to addresses in a range of checked addresses. If not, the IM 24 issues a reset.

We have also appreciated that there may be a need to download new (authentic) code to the flash memory 2 and that this should be provided for so that the AFC does not erroneously reject this new code. To allow this, the verifier processor must be stopped for a period of time M, but again this could leave the possibility of a hack in which the AFC is permanently stopped. To prevent this, the code in ROM 32 causes the verifier processor to automatically issue a chip reset after this period M, and starts the verification at the beginning of the new code in flash memory.

The only commands available to the CPU 10 to control the verifier processor 22 are: STOP, RESTART, PAUSE. Thereafter, the operation of the AFC processor is autonomous and largely in hardware, with the only software being in ROM 32 or RAM 42 which are only accessible by the processor 30.

We have appreciated, however, that these commands need to be available to the CPU to avoid contention and allow flash memory updates, but could open the possibility of hacks which permanently pause or stop the AFC or continually reset. For that reason, further preferred features are included.

A first preferred feature is that no pausing or stopping is allowed during any initial first pass check cycle. The status bit Acheck_is_slow@ indicates whether we are in an initial first pass cycle or not.

A pause request pauses the memory reads for 1 second; to allow for scratch pad updates. A limited number of pause requests are allowed in any one complete signature check cycle. If another pause request is received before the current pause is completed, the request is stored and then executed on completion of the current pause. Up to a limited number of pending pause requests can be queued in this way. Once this limit has been reached, further pause requests will have no effect until the number of pending requests falls below the limit.

A stop request stops the signature check and starts a timer countdown to reset (5 minutes). This is to allow complete code updates. If a restart_request or linked list restart is issued within this time, a new check cycle will be started and the reset is not executed. Once a restart request has been made, no further stop requests can be issued until one check cycle has been completed.

If the decrypted signature/hash value comparison passes, a note of this fact, and the start and end addresses of the passing block, are stored in local RAM. Upon completion of a signature check cycle, a table of passing address ranges will have been built up in peripheral registers. This Alegal address@ table is then enabled.

If the decrypted signature/hash value comparison does not match, a status bit is set to indicate this, an interrupt is asserted to the host CPU and a timer countdown of 1 second is started. This counter cannot be stopped. When it expires, the reset_out signal is asserted. This process gives the host CPU time to interrogate the interrupt, execute a Flash write procedure (whereby a message is written to Flash that is checked on reboot, telling the CPU that there was a previous signature check failure, in which case it is assumed some or all of the code in memory has been compromised and needs to be downloaded again).

The list of legal address registers is updated at the end of each signature check cycle, and enabled after the first cycle. As an independent and continuous hardware process, incoming addresses from the CPU 10 are retimed, captured and checked that they lie within one of these ranges. If this is not the case, the illegal incoming address is stored, a status bit is set, an interrupt is asserted to the host CPU and a timer countdown of 1 second is started. This timer cannot be stopped. At expiration, the reset_out signal is asserted.

All of the above U.S. patents, U.S. patent application publications, U.S. patent applications, foreign patents, foreign patent applications and non-patent publications referred to in this specification and/or listed in the Application Data Sheet, are incorporated herein by reference in their entireties.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit to execute application code to be received from a memory via external connections, comprising:
   a processor to execute the application code from the memory;
   an internal bus to provide the application code to the processor from the memory;
   a verifier processor to receive the application code via the internal bus, wherein the verifier processor continually processes the application code using a verification function while the processor executes the application code from the memory independently of the verifier processor, and to impair the function of the integrated circuit in an event that the application code does not satisfy the verification function; and an instruction monitor to monitor code requests issued by the processor and to impair the function of the integrated circuit unless addresses of the code requests fall within a given range.

2. The semiconductor, integrated circuit according to claim 1 further comprising an internal memory; wherein the given range is stored in the internal memory.

3. The semiconductor integrated circuit according to claim 1 wherein the given range is derived by the verifier processor during a first check of the memory.

4. The semiconductor integrated circuit according to claim 3 wherein the application code in memory comprises a linked list; and wherein the given range comprises a table of linked list addresses.

5. The semiconductor integrated circuit according to claim 3 wherein the verifier processor is to impair the function of the integrated circuit if the verification function is not completed for one complete cycle of the linked list within a predetermined time.

6. The semiconductor integrated circuit according to claim 1 wherein the verifier processor is to receive pause and stop requests and is configured so that any pause and stop request is ineffective during a first check of the code.

7. The semiconductor integrated circuit according to claim 1 wherein the verifier processor is paused for only a predetermined time.

8. The semiconductor integrated circuit according to claim 1 wherein if the application codes does not satisfy the verification function, a reset signal is asserted after a predetermined time.

9. The semiconductor integrated circuit according to claim 8 wherein a status signal is set and stored to indicate that the code does not satisfy the verification function before the reset signal is asserted.

10. The semiconductor integrated circuit according to claim 1 wherein the verification function includes a hash function on the application code.

11. The semiconductor integrated circuit according to claim 1 wherein the verifier processor is to receive a stored secret from the memory; and wherein the verification function comprises a comparison of the secret and the processed application code.

12. The semiconductor integrated circuit according to claim 1 wherein the verification function comprises:
    hashing the application code to produce hashed code;
    retrieving a signature of the application code from a signature store within the memory; and
    verifying the hashed code and the signature using a public key.

13. The semiconductor integrated circuit according to claim 1 wherein the verifier processor comprises a stop input; and wherein the verifier processor is to restart a given time period after a stop and does not stop again until completing the verification function on the application code at least once.

14. The semiconductor integrated circuit according to claim 1 wherein the verifier processor is to request portions of the application code from the memory at intervals between requests by the processor for portions of the application code.

15. The semiconductor integrated circuit according to claim 14 wherein the verifier processor is to request portions of application code at less frequent intervals than the processor.

16. The semiconductor integrated circuit according to claim 14 wherein the verifier processor is to request portions of the application code at pseudo random times.

17. The semiconductor integrated circuit according to claim 14 wherein the verifier processor is to carry out read requests at a faster rate during a first check than in subsequent checks.

18. The semiconductor integrated circuit according to claim 1 wherein impairing the function of the integrated circuit comprises resetting the integrated circuit.

19. A semiconductor integrated circuit to execute application code to be received from a memory, comprising:
    a processor to execute the application code from the memory;
    an internal bus connected to the processor to provide the application code to the processor from the memory;
    a verifier processor to receive the application code via the internal bus, wherein the verifier processor processes the application code using a verification function while the processor executes the application code from the memory independently of the verifier processor, and to impair the execution of the integrated circuit if the application code does not satisfy the verification function; and
    an instruction monitor to be connected to the internal bus, to monitor code requests issued by the processor, and to impair the execution of the integrated circuit unless addresses of the code requests fall within a given range.

20. The semiconductor integrated circuit of claim 19 wherein the given range is derived by the verifier processor during a check of the memory.

21. The semiconductor integrated circuit of claim 19 wherein the application code in memory comprises a linked list; and wherein the given range is stored in a table of linked list addresses.

22. The semiconductor integrated circuit of claim 19 wherein the verification processor is to impair the execution of the integrated circuit by asserting a reset signal to the processor if the application code does not satisfy the verification function within a predetermined time.

23. The semiconductor integrated circuit of claim 19 wherein the verification processor includes:
    an internal processor to coordinate processing of the application code using the verification function and to impair the execution of the integrated circuit if the application code does not satisfy the verification function;
    a code memory to be coupled to the internal processor, to store code for controlling the internal processor to process the application code, and to impair the execution of the integrated circuit if the application code does not satisfy the verification function; and
    an interface circuit to be connected to the internal processor with the internal bus.

24. A memory system, comprising:
    a non-volatile memory to store application code; and
    a semiconductor integrated circuit to execute the application code to be received from the non-volatile memory, the integrated circuit including:
        a processor to execute the application code from the non-volatile memory,
        an internal bus connected to the processor to provide the application code to the processor from the non-volatile memory;
        a verifier processor to receive the application code via the internal bus, wherein the verifier processor processes the application code using a verification function while the processor executes the application code from the non-volatile memory independently of the verifier processor, and to render the memory system at least partly unusable if the application code does not satisfy the verification function, and an instruction monitor to be connected to the internal bus, to monitor code requests issued by the processor, and to impair the execution of the integrated circuit unless addresses of the code requests fall within a given range.

25. The memory system of claim 24 wherein the given range is derived by the verifier processor during a check of the non-volatile memory.

26. The memory system of claim 24 further comprising an internal memory; wherein the non-volatile memory includes a linked list for accessing the application code; and wherein the given range is stored in the internal memory of the integrated circuit as a table of linked list addresses.

27. The memory system of claim 24 wherein the verification processor is to impair the execution of the integrated circuit by asserting a reset signal to the processor if the application code does not satisfy the verification function within a predetermined time.

28. The memory system of claim 24 wherein the verification processor includes:

an internal processor to coordinate the processing of the application code using the verification function and to impair the execution of the integrated circuit if the application code does not satisfy the verification function;

a code memory to be coupled to the internal processor, to store code for controlling the internal processor to process the application code, and to impair the execution of the integrated circuit if the application code does not satisfy the verification function; and an interface circuit to be connected to the internal processor with the internal bus.

29. A method for executing application code received from an external memory via external connections, the method comprising:

executing application code from the external memory with a processor;

providing the application code to the processor via an internal bus;

providing the application code to a verifier processor via the internal bus;

continually processing the application code with the verifier processor, while the processor executes the application code independently of the verifier processor, using a verification function;

monitoring code requests issued by the processor with an instruction monitor; and impairing operation of the integrated circuit if the application code does not satisfy the verification function or if addresses of the code requests fall outside a given range.

30. The method of claim 29 further comprising deriving the given range with the verifier processor during a check of the external memory.

31. The method of claim 29 further comprising storing the given range in an internal memory.

32. The method of claim 29 further comprising:

receiving pause and stop requests at the verifier processor; and configuring the verifier processor so that any pause and stop request is ineffective during a first check of the code.

* * * * *

UNITED STATES PATENT AND TRADEMARK OFFICE
CERTIFICATE OF CORRECTION

PATENT NO. : 7,624,442 B2  Page 1 of 1
APPLICATION NO. : 10/817148
DATED : November 24, 2009
INVENTOR(S) : Dellow et al.

It is certified that error appears in the above-identified patent and that said Letters Patent is hereby corrected as shown below:

Column 1, Line 14      Delete: "unauthorised"
                       Insert: --unauthorized--

Column 1, Line 43      Delete: "unauthorised"
                       Insert: --unauthorized--

Column 1, Line 67      Delete: "unauthorised"
                       Insert: --unauthorized--

Column 2, Line 1       Delete: "unauthorised"
                       Insert: --unauthorized--

Column 3, Line 30      Delete: "of the or"
                       Insert: --for--

Column 4, Line 23      Delete: "author=s"
                       Insert: --author's--

Column 7, Line 29      Delete: "does"
                       Insert: --do--

Signed and Sealed this

Fourteenth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,624,442 B2  Page 1 of 1
APPLICATION NO. : 10/817148
DATED : November 24, 2009
INVENTOR(S) : Dellow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1278 days.

Signed and Sealed this

Twenty-first Day of December, 2010

David J. Kappos
*Director of the United States Patent and Trademark Office*